United States Patent
Montag et al.

(10) Patent No.: US 6,453,757 B1
(45) Date of Patent: Sep. 24, 2002

(54) SYMMETRICAL ULTRASOUND GAS FLOW METER HOUSING AND RELATED MULTI-CONFIGURATION GAS FLOW METER ASSEMBLY

(75) Inventors: Dennis R. Montag; William R. Mazza, Jr.; Kevin A. Long, all of DuBois, PA (US)

(73) Assignee: M&FC Holding Company, Wilmington, DE (US)

( * ) Notice: Subject to any disclaimer, the term of this patent is extended or adjusted under 35 U.S.C. 154(b) by 0 days.

(21) Appl. No.: 09/305,991

(22) Filed: May 6, 1999

(51) Int. Cl.$^7$ ................................................. G01F 1/66
(52) U.S. Cl. .................................................. 73/861.28
(58) Field of Search ........................... 73/861.28, 273; 220/367, 17

(56) References Cited

U.S. PATENT DOCUMENTS

| | | | |
|---|---|---|---|
| 3,978,731 A | | 9/1976 | Reeder et al. ................. 73/407 |
| 4,032,066 A | * | 6/1977 | Wright ......................... 220/17 |
| 4,174,733 A | * | 11/1979 | Eidsmore et al. ............ 137/552 |
| 4,333,352 A | | 6/1982 | Connery et al. .......... 73/861.18 |
| 4,373,401 A | | 2/1983 | Baumoel ................. 73/861.18 |
| 4,567,770 A | | 2/1986 | Rumbold et al. ............. 73/644 |
| 4,582,220 A | * | 4/1986 | Batting ....................... 220/367 |
| 4,945,276 A | | 7/1990 | Mylvaganam et al. ...... 310/326 |
| 5,114,792 A | | 5/1992 | McWilliams et al. ....... 428/422 |
| 5,257,538 A | * | 11/1993 | Spendell ....................... 73/198 |
| 5,351,560 A | | 10/1994 | Russwurm ............... 73/861.27 |
| 5,433,117 A | | 7/1995 | Taphorn et al. .......... 73/861.28 |
| 5,728,948 A | | 3/1998 | Bignell et al. ........... 73/861.28 |
| 5,741,969 A | * | 4/1998 | Sebastopoli ................. 73/273 |

FOREIGN PATENT DOCUMENTS

| | | |
|---|---|---|
| EP | 759540 | 2/1997 |
| FR | 9706415 | 2/1997 |
| GB | 2301186 | 5/1995 |

OTHER PUBLICATIONS

Siemens Measurements Liited; Adaptive Domestic Gas Meter; Semi–Submerged Consumer Unit; 5/97.

* cited by examiner

Primary Examiner—Benjamin R. Fuller
Assistant Examiner—Jewel V. Thompson
(74) Attorney, Agent, or Firm—McDermott, Will & Emery

(57) ABSTRACT

An ultrasonic gas meter housing member is configured to provide an associated multi-configuration ultrasonic gas meter assembly. The housing member is installable in an ultrasonic gas flow meter which includes an internal flow measurement tube along which gas travels for flow measurement, the tube having an inlet end and an outlet end. The ultrasonic gas meter housing member includes a closed back portion and a front portion spaced from the back portion to define a space for receiving the internal flow measurement tube such that the tube extends across the internal space of the housing member. At least one wall portion extends between the back portion and the front portion, the wall portion having a first opening and a second opening therethrough for connection of the housing member to a gas inlet pipe and a gas outlet pipe. The gas meter housing member is symmetrical about a plane which divides the housing member into a first portion and a second portion. The symmetrical configuration enables the housing member to receive the flow measurement tube in both a first orientation in which the first and second opening face in a first direction and the inlet end of the flow measurement tube is positioned in the first portion of the housing member and the outlet end is positioned in the second portion, and a second orientation in which the first and second opening face in a second direction substantially perpendicular to the first direction and the inlet end of the flow measurement tube is positioned in the second portion of the gas meter housing member and the outlet end is positioned in the first portion. The first and second orientations are particularly useful in enabling the housing member to be used both in gas meter installation sites where the gas pipes extend downward and in gas meter installation sites where the gas pipes extend upward.

16 Claims, 3 Drawing Sheets

SYMMETRICAL ULTRASOUND GAS FLOW METER HOUSING AND RELATED MULTI-CONFIGURATION GAS FLOW METER ASSEMBLY

FIELD OF THE INVENTION

The present invention relates to ultrasonic gas flow meters and, more particularly, to an ultrasonic gas flow meter housing which facilitates interconnection with other gas flow meter components to provide a multi-configuration system.

BACKGROUND OF THE INVENTION

Ultrasonic gas flow meters are generally well known. Such meters commonly utilize a technique in which the difference between the time of travel of an ultrasonic wave upstream in a flowing gas and the time of travel of an ultrasonic wave downstream in the flowing gas is used to determined the flow rate of the gas. However, other techniques are also known and used.

Accumulation of liquids in the housings of ultrasonic gas flow meters can occur with sufficient frequency and in sufficient quantity to interfere with accurate gas flow measurement. In such instances the excessive liquid presents a service and maintenance problem for the gas utilities which maintain such meters, and therefore acts as a potential deterrent to successful widespread introduction and use of ultrasonic gas flow meters. The standard attachment position for residential size gas meters is with the inlet and outlet piping connections positioned on the top of the meter case or housing. In this position, the meter housing can become an accumulator for any liquids that are being transported by the flowing gas. In such ultrasonic gas flow meters if the liquid enters the area through which ultrasonic signals pass, the gas flow volume will tend to be measured inaccurately.

Thus, in certain applications there is a need for positioning the inlet and outlet piping connections on the bottom of the meter housing in order to permit the connections to effectively act as drains for any liquids that may enter the meter. However, this housing configuration presents a problem in many areas where the majority of gas meter installation sites still include downwardly extending inlet and outlet piping positioned for entry into the top of a gas meter housing. Utilizing two different gas meter housing configurations, one with top openings and one with bottom openings, would increase manufacturing costs and would be less well received by the gas utilities.

Accordingly, it would be desirable to provide a gas meter housing configured to reduce liquid accumulation therein when installed. It would also be desirable to provide a gas meter housing adapted for installation in at least two different positions within ultrasonic gas meter systems, thereby providing a single housing useful in multiple installation schemes.

SUMMARY OF THE INVENTION

The present invention is an ultrasonic gas meter housing member configured to provide an associated multi-configuration ultrasonic gas meter assembly. In a preferred embodiment of the invention the housing member is installable in an ultrasonic gas flow meter which includes an internal flow measurement tube along which gas travels for flow measurement, the tube having an inlet end and an outlet end. The ultrasonic gas meter housing member includes a closed back portion generally rectangular in shape and a front portion spaced from the back portion to define a space for receiving the internal flow measurement tube such that the tube extends substantially along at least a portion of a longitudinal axis of the housing member. First, second, third, and fourth wall portions extending between the back portion and the front portion, the first wall portion having a first opening and a second opening therethrough for connection of the housing member to a gas inlet pipe and a gas outlet pipe, the first and second openings facing in substantially the same direction. The gas meter housing member is symmetrical about a plane which divides the housing member into a first half and a second half, the plane being perpendicular to the longitudinal axis. The symmetrical configuration enables the housing member to receive the flow measurement tube in both a first orientation in which the first and second opening face in a first direction and the inlet end of the flow measurement tube is positioned in the first half of the housing member and the outlet end is positioned in the second half, and a second orientation in which the first and second opening face in a second direction substantially opposite to the first direction and the inlet end of the flow measurement tube is positioned in the second half of the gas meter housing member and the outlet end is positioned in the first half. The first and second orientations are particularly useful in enabling the housing member to be used both in gas meter installation sites where the gas pipes extend downward and in gas meter installation sites where the gas pipes extend upward, so that two different housing configurations need not be provided. Further, in installations where the gas pipes extend upward, the first and second openings through the housing member will face downward and will prevent the build up of liquids within the meter by allowing them to drain.

In another aspect of the invention, a multi-configuration ultrasonic gas meter assembly is provided and includes a first housing member having a back enclosure portion, a front portion spaced from the back enclosure portion to define an internal space, and at least one wall portion extending between the back enclosure portion and the front portion, at least one wall portion having a first opening and a second opening therethrough for connection to a gas inlet pipe and a gas outlet pipe. A gas flow measurement tube is provided for positioning at least partially within the internal space of the first housing member and has a gas inlet end and a gas outlet end. At least one ultrasonic transducer is positioned proximate the gas flow measurement tube for directing an ultrasonic signal along at least a portion of a length of the gas flow measurement tube. An orientation between the first housing member and the measurement tube is selectable between at lest two configurations as necessary for attachment of the gas inlet pipe and the gas outlet pipe, and includes a first assembly configuration in which the first and second openings face in a first direction and gas travels in the first opening, through the gas flow measurement tube from the inlet end to the outlet end, and out of the second opening, and a second assembly configuration in which the first and second openings face in a second direction which is substantially opposite the first direction and in which gas travels in the second opening, through the gas flow measurement tube from the inlet end to the outlet end, and out of the first opening. As above, the two assembly configurations facilitate installation of the gas meter assembly both in gas meter installation sites where the gas pipes extend downward and in gas meter installation sites where the gas pipes extend upward.

Accordingly, it is an object of the present invention to provide an ultrasonic gas meter housing member configured for attachment to both downwardly extending gas pipes and upwardly extending gas pipes; a multi-configuration ultrasonic gas meter assembly; an ultrasonic gas meter housing positionable to permit drainage of fluid therefrom; and a method of manufacturing an improved ultrasonic gas meter housing member. Other objects and advantages of the present invention may be ascertained from a review of the following description and drawings.

DETAILED DESCRIPTION

Figure 1A:
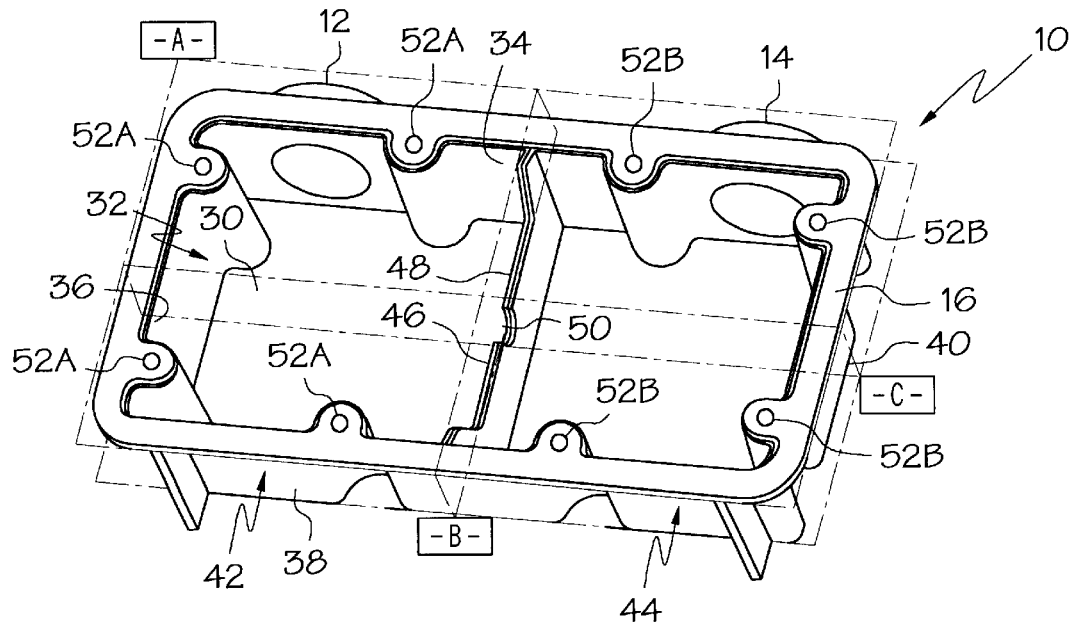
FIGS. 1A and 1B show front perspective views of an ultrasonic gas meter housing member in accordance with one embodiment of the present invention.
Figure 1B:
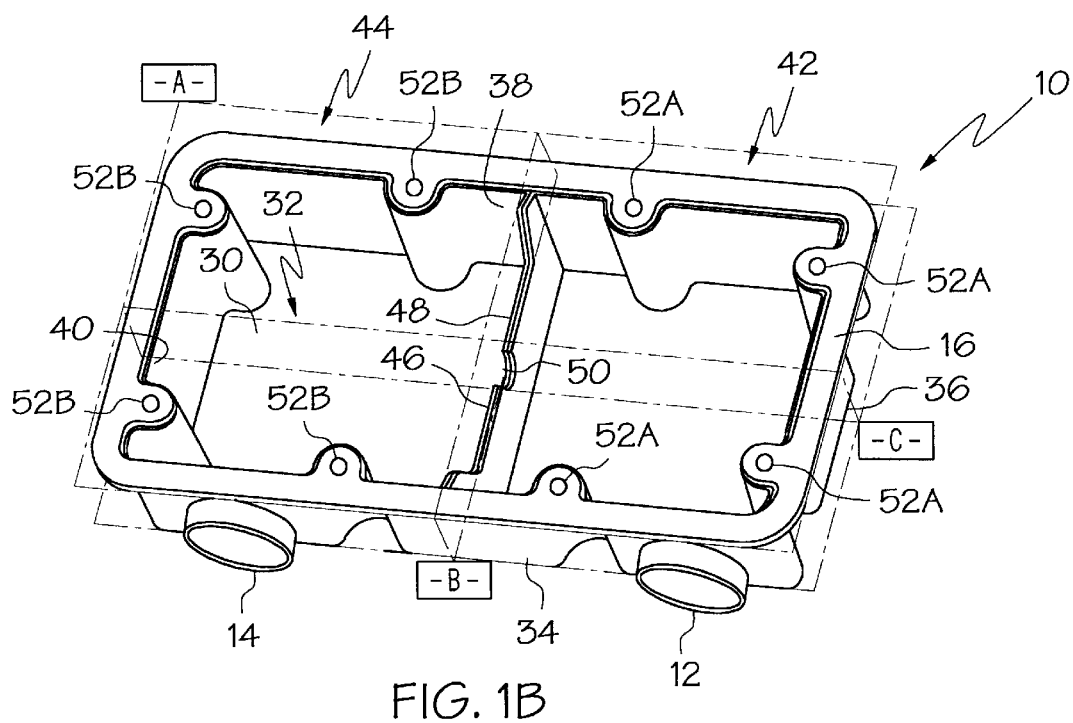

Referring to the drawings, FIGS. 1A and 1B show front perspective views of an ultrasonic gas meter housing member 10 according to a preferred embodiment of the invention, FIG. 1A showing gas pipe connection openings 12 and 14 of the housing member 10 facing in a generally upward direction and FIG. 1B showing openings 12 and 14 facing in a generally downward direction. Three reference planes A, B, and C are shown in shadow with plane A extending generally parallel to a front portion 16 of the housing member 10, plane B extending vertically across a central portion of the housing member 10, and plane C extending horizontally across a central portion of the housing member 10. As shown, housing member is symmetrical about plane B and partially symmetrical about plane C. With this symmetry about the central planes, the internal features of the housing member are the same, relative to the remaining meter components, whether the body is oriented with the connection openings 12 and 14 facing upward or downward. Such remaining meter components are shown in the exploded views of FIGS. 2 and 3 and generally include a flow tube assembly 18, one or more ultrasonic transducers 20, and a front housing member 22. The flow tube assembly 18 includes a gas flow measurement tube 24 having an inlet end 26 and an outlet end 28, along which gas travels for flow measurement.

Referring again to FIGS. 1A and 1B, the housing member 10 includes a closed back portion 30 which, in the preferred embodiment, is generally rectangular in shape. The front portion 16, being spaced from the back portion 30, defines an internal space 32 for receiving the gas flow measurement tube such that the tube extends substantially along at least a portion of a longitudinal or horizontal axis of the housing member, which axis extends within plane C. First, second, third and fourth wall portions 34, 36, 38 and 40 extend between the back portion 30 and the front portion 16 of the housing member. The first wall portion includes opening 12 and opening 14 therethrough for connection of the housing member to a gas inlet pipe and a gas outlet pipe. The openings 12 and 14 preferably face in substantially the same direction as shown.

As noted above, the housing member 10 is symmetrical about plane B which divides the housing member into a first portion 42 and a second portion 44. Such symmetrical configuration enables the housing member 10 to receive the flow measurement tube in both a first orientation in which the openings 12 and 14 face upward and the inlet end 26 of the flow measurement tube 24 is positioned in portion 42 of the housing member and the outlet end 28 is positioned in portion 44 of the housing member 10, and a second orientation in which the openings 12 and 14 face generally downward and the inlet end 26 of the gas flow measurement tube 24 is positioned in portion 44 of the gas meter housing member and the outlet end 28 is positioned in portion 42. The housing member 10 also includes a divider plate 46 which extends across internal space 32 in alignment with and defining plane B. The divider plate 46 includes an outwardly facing edge 48 having at least one recessed portion 50 shaped to receive a portion of the flow measurement tube 24. Preferably, an internal perimeter shape of portion 42 and an internal perimeter shape of portion 44 are the same such that the perimeter shapes are mirror images of each other about plane B. This similarity of internal configuration facilitates receipt of the remaining gas meter assembly components within either portion as necessary.

Front portion 16 also includes a plurality of attachment apertures 52A and 52B arranged thereabout for connecting the gas flow measurement tube assembly thereto. Attachment apertures 52A are positioned to a first side of the divider plate 46 on portion 42 of the housing member 10 and attachment apertures 52B are positioned to a second side of the divider plate 46 on portion 44 of the housing member 10. Notably, the symmetrical nature of the housing member extends to the positioning of the apertures 52A and 52B about plane B of the housing member 10. As will be explained in greater detail below, the symmetry of the positioning of such attachment apertures 52A and 52B facilitates attachment of the housing member 10 to the remaining components of the ultrasonic gas meter assemblies in an orientation in which openings 12 and 14 extend upward and an orientation in which openings 12 and 14 extend downward.

Figure 2:
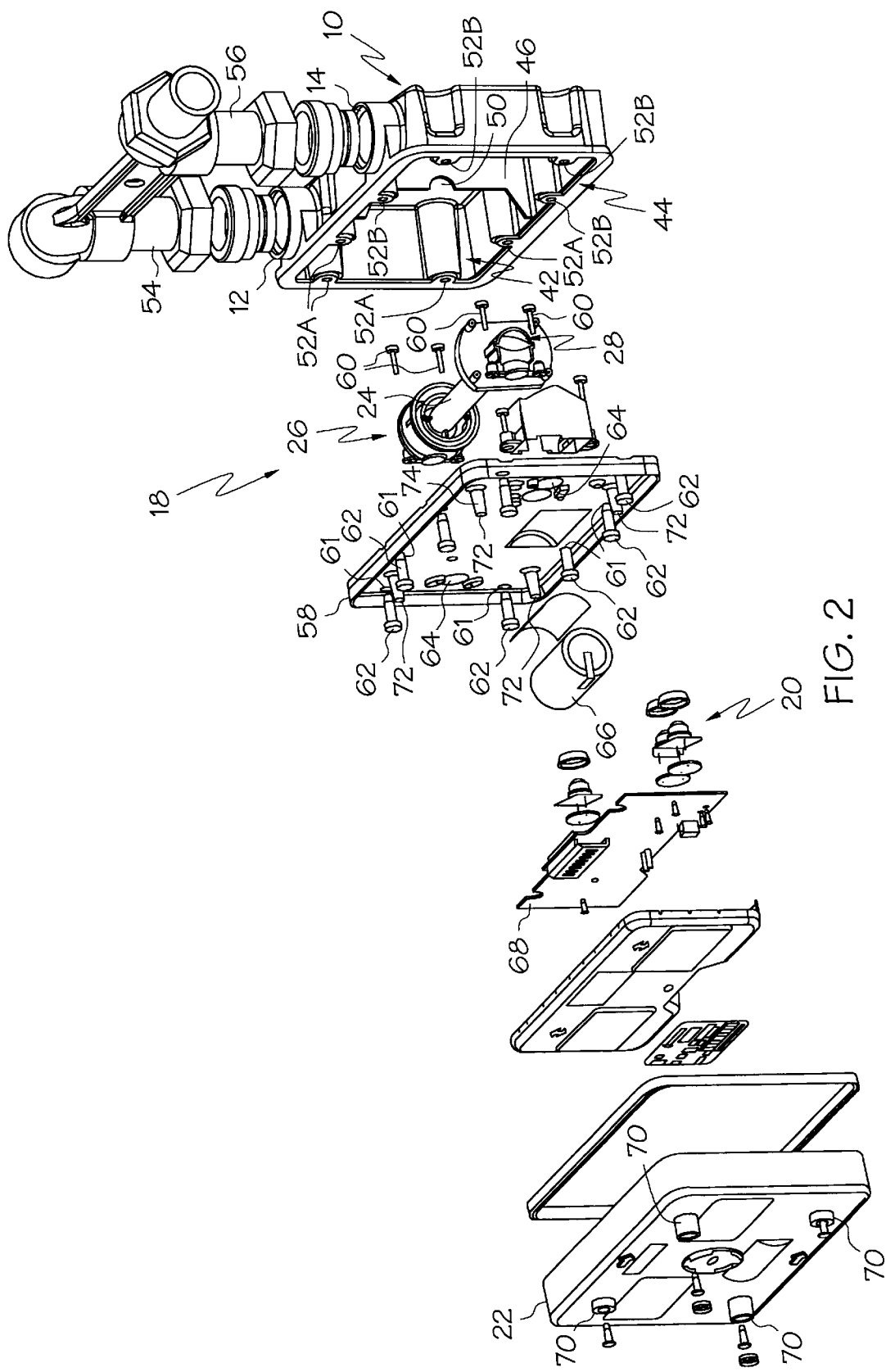
FIG. 2 shows an exploded view of a multi-configuration ultrasonic gas meter assembly incorporating the housing member of FIGS. 1A and 1B in a first assembly configuration.
Figure 3:
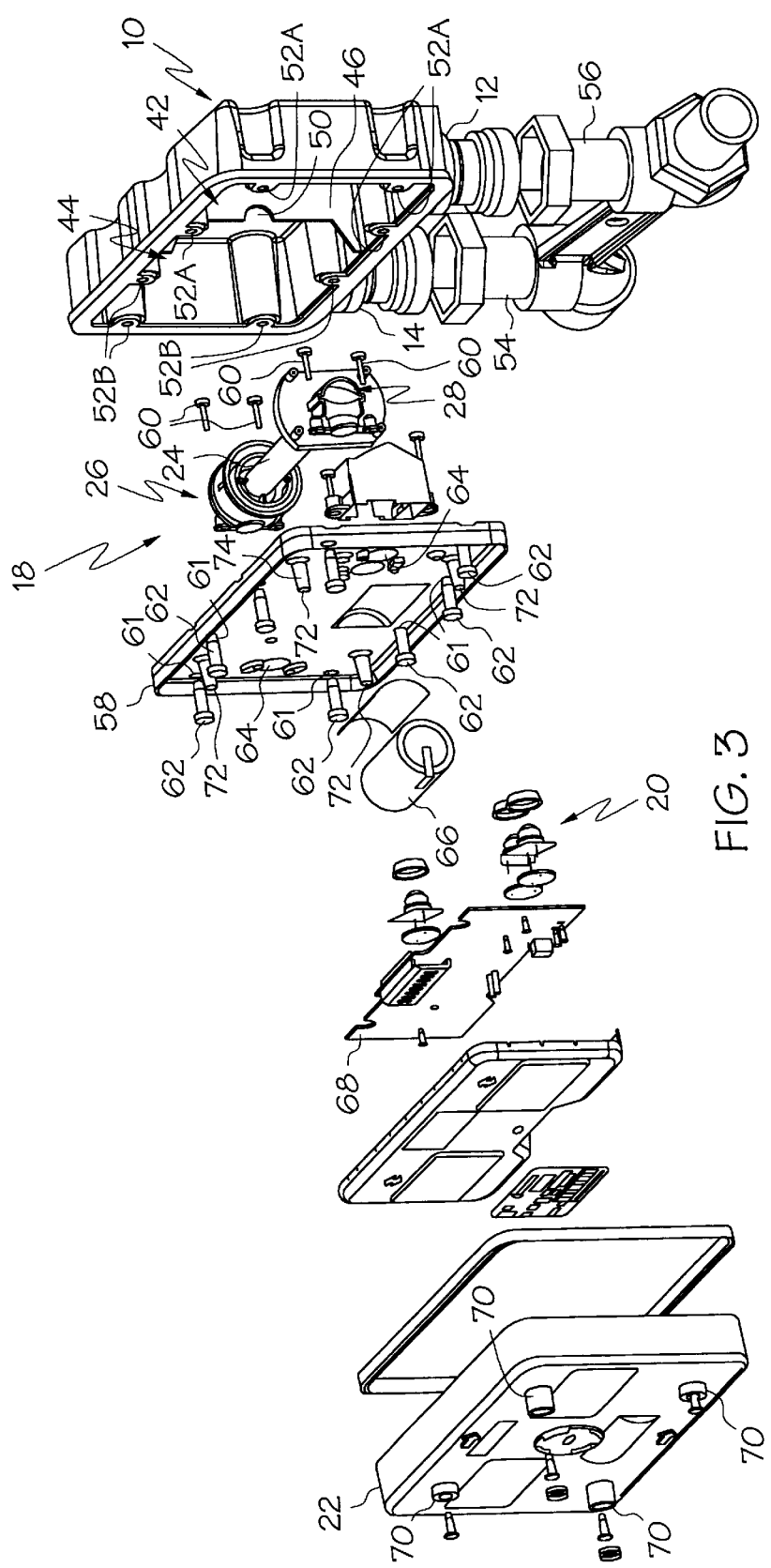
FIG. 3 shows an exploded view of the multi-configuration ultrasonic gas meter assembly of FIG. 2 in a second assembly configuration.

Referring to FIG. 2, one configuration for an ultrasonic gas meter assembly incorporating the housing member 10 is shown in which the housing member 10 is positioned with openings 12 and 14 facing substantially upward for connection to downwardly extending gas inlet pipe 54 and gas outlet pipe 56. Any known gas pipe connection arrangement can be used with the present invention. The flow tube assembly 18 includes gas flow measurement tube 24 and a connection plate 58 to which the gas flow measurement tube 24 is attached by fasteners 60. Thus, the gas flow measurement tube 24 secures to plate 58 and the plate 58 is then secured to the housing member 10. In this regard, plate 58 is provided with a plurality of apertures 61 for attaching the flow tube assembly to the housing member 10 via alignment with the attachment apertures 52A and 52B thereof. The mounting apertures 61 align with the attachment apertures 52A and 52B. Fasteners 62 are then inserted within the aligned apertures. Importantly, the apertures 61 of plate 58 align with apertures 52A and 52B of housing member 10 both when the housing member 10 is positioned with openings 12 and 14 extending upward as shown in FIG. 2 and when the housing member 10 is positioned with openings 12 and 14 extending downward as shown in FIG. 3. In this regard, FIG. 3 shows a second configuration for the assembly. The recessed portion 50 of divider plate 46 is shaped and configured to receive a central portion of the gas flow measurement tube 24 when the flow tube assembly 18 is attached to the housing member 10.

Also shown in FIGS. 2 and 3 are transducers 20 which extend through openings 64 in the plate 58 so that they are positioned proximate the gas flow measurement tube 24 to direct ultrasonic signals along the length of the tube for gas flow measurement purposes. A battery 66 is provided for powering the transducers 20 and their associated electronics which are included on circuit board 68. In a preferred embodiment, the transducers 20 include a first transducer positioned toward the inlet end 26 of the gas flow measurement tube 24 and a second transducer positioned toward the outlet end 28 of the gas flow measurement tube 24. A third transducer may also be provided as is known in the art for speed of sound measurement. Front housing member 22 also includes a plurality of attachment apertures 70 which are positioned for alignment with a corresponding plurality of attachment apertures 72 which are also positioned on plate 58, particularly on projections 74 which extend from plate 58.

In the first assembly configuration shown in FIG. 2, when assembled the gas flow measurement tube 24 is positioned with inlet end 26 within portion 42 of the housing member 10 and with outlet end 28 positioned in portion 44 of the housing member 10. During operation in this configuration gas flows in inlet pipe 54, through opening 12, into inlet end 26 of gas flow measurement tube 24 and along the length thereof to outlet end 28, out of opening 14 and into gas outlet pipe 56. In the second assembly configuration shown in FIG. 3, the gas flow measurement tube 24 is positioned with inlet end 26 within portion 44 of housing member 10 and with outlet end 28 within portion 42 of housing member 10. In this configuration, during operation gas flows in gas inlet pipe 54, through opening 14 of housing member 10, into gas inlet end 26 of gas flow measurement tube 24 and along the length thereof to outlet end 28, through opening 12 of housing member 10 and into gas outlet pipe 56. In both configurations, the components of the gas meter assembly, other than the housing member 10, remain in a single configuration which is adapted for flow measurement from left to right relative to the front of the assembly. The housing member 10 is simply rotated 180 degrees as necessary to attach to either downwardly extending pipes 54 and 56 of FIG. 2 or upwardly extending pipes 54 and 56 of FIG. 3. Thus, the housing member 10 and its manner of connection to the remaining components of the system facilitates a multi-configuration gas meter assembly which can be used in both types of installations. This multi-configuration assembly therefore eliminates the need for manufacturing two different gas meter assemblies and the related cost which would be associated therewith.

Housing members 10 and 22, and plate 58 may be formed from any suitable material such as a molded plastic, or other materials commonly used in the art.

While the forms of the apparatus herein described constitute preferred embodiments of the invention, it is to be understood that the invention is not limited to these precise forms of apparatus, and changes may be made therein without departing from the scope of the invention.

For example, slight differences between the internal perimeter shape of portions 42 and 44 of the housing member 10 could exist where such differences do not interfere with connection to the remaining components of the ultrasonic gas meter assembly. Further, while attachment apertures are provided on both housing member 10 and plate 58 for alignment in both assembly configurations, it is recognized that housing member 10 could instead be provided with similarly positioned threaded extensions which would pass through the attachment apertures of plate 58, with nut-type members then being threaded onto the threaded extensions. Still further, while a generally rectangular shaped housing is shown in the preferred embodiment, it is contemplated that other housing shapes could be provided without departing from the scope of the invention.

What is claimed is:

1. A multi-configuration ultrasonic gas meter assembly having at least first and second assembly configurations, comprising:

a first housing member including a back enclosure portion, a front portion spaced from the back enclosure portion to define an internal space, and wall portions extending between the back enclosure portion and the front portion, one of the wall portions having a first opening and a second opening therethrough for connection to a gas inlet pipe and a gas outlet pipe;

a flow tube assembly including a gas flow measurement tube for positioning at least partially within the internal space of the first housing member and having a gas inlet end and a gas outlet end;

at least one ultrasonic transducer positioned proximate the gas flow measurement tube for directing an ultrasonic signal along at least a portion of a length of the gas flow measurement tube; and wherein the first assembly configuration includes the gas flow measurement tube positioned within the internal space of the first housing member such that the first and second openings each face in a same first direction and gas travels in the first opening, through the gas flow measurement tube from the gas inlet end to the gas outlet end, and out of the second opening, and the second assembly configuration includes the gas flow measurement tube positioned within the internal space of the first housing member such that the first and second openings each face in a same second direction which is substantially opposite the first direction and in which gas travels in the second opening, through the gas flow measurement tube from the gas inlet end to the gas outlet end, and out of the first opening.

2. The multi-configuration ultrasonic gas meter assembly of claim 1 wherein the first housing member includes a first plurality of attachment apertures and the flow tube assembly includes a second plurality of attachment apertures, the flow tube assembly being attached to the first housing member by alignment of the first plurality of attachment apertures with the second plurality of attachment apertures, the first plurality of attachment apertures aligning with the second plurality of attachment apertures in both the first assembly configuration and the second assembly configuration.

3. The multi-configuration ultrasonic gas meter assembly of claim 1 wherein the flow tube assembly further includes a plate member on which the second plurality of attachment apertures are located, the gas flow measurement tube being attached to the plate member.

4. The multi-configuration ultrasonic gas meter assembly of claim 3, further comprising openings in the plate member, and wherein the at least one ultrasonic transducer comprises a first transducer positioned toward the inlet end of the gas flow measurement tube and a second transducer positioned toward the outlet end of the gas flow measurement tube, the first and second transducers extending through respective ones of the openings in the plate member.

5. The multi-configuration ultrasonic gas meter assembly of claim 3, further comprising: a second housing member including a third plurality of attachment apertures; extensions on the plate member with a fourth plurality of attachment apertures, wherein the third plurality of attachment apertures are positioned for alignment with the fourth plurality of attachment apertures for attachment of the second housing member to the plate member.

6. The multi-configuration ultrasonic gas meter assembly of claim 1, further comprising a divider plate extending across the internal space of the first housing member and dividing the housing into first and second portions, the divider plate including an externally facing edge with at least one recessed portion for receiving the gas flow measurement tube.

7. The multi-configuration ultrasonic gas meter assembly of claim 6 further comprising a first plurality of attachment apertures positioned on the first portion of the first housing member and a second plurality of attachment apertures positioned on the second portion of the first housing member, wherein the second plurality of attachment apertures are symmetrically oriented relative to the first plurality of attachment apertures about a plane defined by the divider plate.

8. The multi-configuration ultrasonic gas meter assembly of claim 1, wherein the first direction is a substantially downward direction such that at least one of the first and second openings of the first housing member permits drainage of fluid from the first housing member in the first assembly configuration.

9. A multi-configuration ultrasonic gas meter assembly, comprising:
   a first housing member including a back enclosure portion, a front portion spaced from the back enclosure portion to define an internal space, and wall portions extending between the back enclosure portion and the front portion, one of the wall portions having a first opening and a second opening therethrough for connection to a gas inlet pipe and a gas outlet pipe;
   a gas flow measurement tube for positioning at least partially within the internal space of the first housing member and having a gas inlet end and a gas outlet end;
   at least one ultrasonic transducer positioned proximate the gas flow measurement tube for directing an ultrasonic signal along at least a portion of a length of the gas flow measurement tube; and
   a divider plate defining a plane and extending across the internal space of the first housing member and dividing the internal space into first and second portions having perimeter shapes, the perimeter shape of the first portion of the internal space comprising a mirror-image of the perimeter shape of the second portion of the internal space about the plane defined by the divider plate.

10. The multi-configuration ultrasonic gas meter assembly of claim 9, wherein the divider plate includes an externally facing edge portion having at least one recess for receiving a portion of the gas flow measurement tube.

11. An ultrasonic gas meter assembly for installation in both gas meter systems in which a gas inlet pipe and a gas outlet pipe extend substantially downward and gas meter systems in which the gas inlet pipe and gas outlet pipe extend substantially upward, the gas meter assembly comprising:
   a first housing member including a back enclosure portion and wall portions extending from the back enclosure portion and defining an internal space thereof, one of the wall portions including a first opening therethrough and a second opening therethrough for connecting the first housing member to the gas inlet pipe and gas outlet pipe, a divider plate extending across the internal space and dividing the internal space into first and second portions;
   a gas flow measurement tube for positioning at least partially within the internal space of the first housing member and having a gas inlet end and a gas outlet end;
   at least one ultrasonic transducer positioned proximate the gas flow measurement tube for directing an ultrasonic signal along at least a portion of a length of the gas flow measurement tube; and
   means for attaching the first housing member to the gas flow measurement tube in a first orientation in which the inlet end is positioned in the first portion of the internal space and the outlet end is positioned in the second portion of the internal space, and for attaching the first housing member to the gas flow measurement tube in a second orientation in which the inlet end is positioned in the second portion of the internal space and the outlet end is positioned in the first portion of the internal space.

12. The ultrasonic gas meter assembly of claim 11 wherein the divider plate includes an externally facing edge portion having at least one recess for receiving a portion of the gas flow measurement tube.

13. An ultrasonic gas meter housing member installable in an ultrasonic gas flow meter which includes an internal flow measurement tube along which gas travels for flow measurement, the tube having an inlet end and an outlet end, the ultrasonic gas meter housing member comprising:
   a back panel portion;
   a front portion spaced from the back panel portion to define a space for receiving the internal flow measurement tube;
   wall portions extending between the back panel portion and the front portion, at least one of the wall portions having a first opening and a second opening therethrough for connection to a gas inlet pipe and a gas outlet pipe; and
   wherein the gas meter housing member is configured to receive the internal flow measurement tube when oriented in at least two different positions relative thereto, including a first position in which the first and second openings face in a first direction and gas travels in the first opening, through the internal flow measurement tube from the inlet end to the outlet end, and out of the second opening, and a second position in which said first and second openings face in a second direction which is substantially opposite the first direction and in which gas travels in the second opening, through the internal flow measurement tube from the inlet end to the outlet end, and out of the second opening.

14. An ultrasonic gas meter housing member installable in an ultrasonic gas flow meter which includes an internal flow measurement tube along which gas travels for flow measurement, the tube having an inlet end and an outlet end, the ultrasonic gas meter housing member comprising:
   a closed back portion;
   a front portion spaced from the back portion to define a space for receiving the internal flow measurement tube such that the tube extends substantially along at least a portion of a longitudinal axis of the housing member;
   first, second, third, and fourth wall portions extending between the back portion and the front portion, the first wall portion having a first opening and a second opening therethrough for connection of the housing member to a gas inlet pipe and a gas outlet pipe, the first and second openings facing in substantially the same direction; and
   wherein the gas meter housing member is symmetrical about a plane which divides the gas meter housing member into a first half and a second half, the plane being perpendicular to the longitudinal axis, such symmetrical configuration for receiving the flow measurement tube in both a first orientation in which the first and second opening face in a first direction and the inlet end of the flow measurement tube is positioned in the first half of the gas meter housing member and the outlet end is positioned in the second half of the gas meter housing member, and a second orientation in which the first and second opening face in a second direction substantially perpendicular to the first direction and the inlet end of the flow measurement tube is positioned in the second half of the gas meter housing member and the outlet end is positioned in the first half of the gas meter housing member.

15. The ultrasonic gas meter housing member of claim 14 further comprising a divider plate which defines said plane and extends across the internal space of the housing member, the divider plate including an outwardly facing edge having at least one recessed portion shaped to receive a flow measurement tube.

16. An ultrasonic gas meter housing member installable in an ultrasonic gas flow meter which includes an internal flow measurement tube along which gas travels for flow measurement, the tube having an inlet end and an outlet end, the ultrasonic gas meter housing member comprising:

a closed back portion;

an open front portion spaced from the back portion to define a space for receiving the flow measurement tube such that the tube extends substantially along at least a portion of a longitudinal axis of the housing member;

at least one wall portion extending between the closed back portion and the open front portion and having a first connection opening and a second connection opening therethrough, one of the first and second connection openings for taking in gas and the other of said connection openings for exhausting gas, the first and second openings facing in substantially the same direction;

a divider plate defining a plane and extending across the internal space of the housing member and dividing the space into first and second portions; and a plurality of attachment apertures on the front portion for connecting the flow measurement assembly to the front portion, including a first plurality of attachment apertures positioned to a first side of the divider plate and a second plurality of apertures positioned to a second side of the divider plate, an orientation of the second plurality of attachment apertures being symmetrical relative to the first plurality of attachment apertures about the plane defined by the divider plate.

* * * * *

UNITED STATES PATENT AND TRADEMARK OFFICE
CERTIFICATE OF CORRECTION

PATENT NO.    : 6,453,757 B1
DATED         : September 24, 2002
INVENTOR(S)   : Dennis R. Montag et al.

It is certified that error appears in the above-identified patent and that said Letters Patent is hereby corrected as shown below:

<u>Title page,</u>
Item [54], Title, replace "ULTRASOUND" with -- ULTRASONIC -- therefor the title should appear as: -- SYMMETRICAL ULTRASONIC GAS FLOW METER HOUSING AND RELATED MULTI-CONFIGURATION GAS FLOW METER ASSEMBLY --

Signed and Sealed this

Twenty-eighth Day of January, 2003

JAMES E. ROGAN
*Director of the United States Patent and Trademark Office*